(12) United States Patent
Ainley et al.

(10) Patent No.: US 10,137,381 B2
(45) Date of Patent: Nov. 27, 2018

(54) TOY COMPRISING A ROTOR

(71) Applicant: LEGO A/S, Billund (DK)

(72) Inventors: Timothy Mark Ainley, Kolding (DK); Jesper Carol Nielsen, Bryrup (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 15/544,094

(22) PCT Filed: Jan. 18, 2016

(86) PCT No.: PCT/DK2016/050014
§ 371 (c)(1),
(2) Date: Jul. 17, 2017

(87) PCT Pub. No.: WO2016/116109
PCT Pub. Date: Jul. 28, 2016

(65) Prior Publication Data
US 2018/0008899 A1 Jan. 11, 2018

(30) Foreign Application Priority Data

Jan. 21, 2015 (DK) .................................. 2015 70032

(51) Int. Cl.
*A63H 27/14* (2006.01)
*A63H 27/00* (2006.01)
*A23G 3/56* (2006.01)
(52) U.S. Cl.
CPC ............. *A63H 27/14* (2013.01); *A23G 3/563* (2013.01); *A63H 27/12* (2013.01)
(58) Field of Classification Search
CPC ...... A63H 17/008; A63H 27/12; A63H 27/14; A63H 29/24

(Continued)

(56) References Cited

U.S. PATENT DOCUMENTS 2,051,151 A * 8/1936 Northrop ............... A63H 27/12
446/40
2,561,554 A * 7/1951 Barist ...................... A63H 5/04
446/42

(Continued)

FOREIGN PATENT DOCUMENTS

CN 102743882 A 10/2012
EP 0 590 432 A2 4/1994

(Continued)

OTHER PUBLICATIONS

DKPTO's First Office Action issued in related application No. PA 2015 70031, dated Aug. 18, 2015. (English translation unavailable).

(Continued)

*Primary Examiner* — Alexander Niconovich
(74) *Attorney, Agent, or Firm* — Day Pitney LLP

(57) ABSTRACT

A toy comprising a rotor and a centrally arranged capsule, wherein the capsule comprises an actuator mechanism that is configured to cooperate with a launch element and an actuator element, wherein the actuator element is configured for engaging with the actuator mechanism to transfer a momentum to the rotor, whereby the rotor can rotate and be launched from the launch element, wherein the capsule is a separate part relative to the rotor, and the capsule comprises at least two capsule parts whereby the two capsule parts can be opened when the rotor and the capsule are separated, and wherein rotor, capsule and actuator mechanism are connected to each other to the effect that the momentum from the actuator element is transferred to the actuator mechanism that conveys the momentum on from the capsule to the rotor, when the at least to capsule parts are closed.

10 Claims, 4 Drawing Sheets

(58) Field of Classification Search
USPC .................. 446/34, 36, 38, 236, 429, 45
See application file for complete search history.

(56) References Cited

U.S. PATENT DOCUMENTS

| | | | | |
|---|---|---|---|---|
| 3,473,256 | A * | 10/1969 | Tyler | A63H 27/14 446/38 |
| 3,605,328 | A | 9/1971 | Kilroy, Jr. | |
| 3,701,216 | A * | 10/1972 | Smith, III | A63F 7/2472 185/39 |
| 4,030,238 | A * | 6/1977 | Lakin | A63H 13/04 446/36 |
| 4,107,871 | A * | 8/1978 | Hornsby, Jr. | A63H 27/14 446/41 |
| 4,781,642 | A * | 11/1988 | Stanzel | A63H 27/12 446/38 |
| 5,525,086 | A * | 6/1996 | Gentile | A63H 27/10 446/234 |
| 7,481,691 | B2 * | 1/2009 | Sze | A63H 27/12 124/26 |
| 7,950,976 | B2 * | 5/2011 | Bernstein | A63H 17/008 446/39 |
| 8,128,454 | B2 * | 3/2012 | Rosenblum | A63H 17/008 446/236 |
| 9,610,515 | B2 * | 4/2017 | Rehkemper | A63H 17/008 |
| 2002/0098768 | A1 * | 7/2002 | Kuo | A63H 27/12 446/39 |
| 2004/0161999 | A1 * | 8/2004 | Yu | A63H 27/12 446/36 |
| 2006/0046610 | A1 * | 3/2006 | Laurienzo | A63H 17/008 446/435 |
| 2006/0099880 | A1 * | 5/2006 | Laurienzo | A63H 17/006 446/247 |
| 2006/0183399 | A1 * | 8/2006 | Sze | A63H 27/12 446/45 |
| 2008/0096460 | A1 * | 4/2008 | Sandoval | A63H 17/008 446/279 |
| 2010/0248580 | A1 | 9/2010 | Lin | |
| 2014/0239591 | A1 * | 8/2014 | Rehkemper | A63H 17/008 273/317 |

FOREIGN PATENT DOCUMENTS

| | | |
|---|---|---|
| EP | 0 985 351 A2 | 3/2000 |
| JP | H10-108985 A | 4/1998 |
| JP | 2003 190647 A | 7/2003 |
| JP | 2004 065593 A | 3/2004 |
| WO | 2013156037 A1 | 10/2013 |

OTHER PUBLICATIONS

International Search Report issued in related international application No. PCT/DK2016/050013, dated May 24, 2016.
Written Opinion of International Searching Authority issued in related international application No. PCT/DK2016/050013, dated May 24, 2016.
DKPTO's First Office Action issued in priority application No. PA 2015 70032, dated Aug. 17, 2015 (English ranslation unavailable).
International Search Report issued in corresponding international application No. PCT/DK2016/050014, dated May 24, 2016.
Written Opinion of International Searching Authority issued in corresponding international application No. PCT/DK2016/050014, dated May 24, 2016.
International Preliminary Report on Patentability issued in corresponding international application No. PCT/DK2016/050014, dated Jan. 2, 2017.
USPTO's Non-Final Office Action together with list of references cited by Examiner, issued in related U.S. Appl. No. 15/544,124, dated Dec. 7, 2017.

* cited by examiner

TOY COMPRISING A ROTOR

CROSS-REFERENCE TO RELATED APPLICATIONS

This application is a U.S. National Stage of International Application No. PCT/DK2016/050014, filed on 18 Jan. 2016 and published on 28 Jul. 2016, as WO 2016/116109 A1, which claims the benefit of priority to Danish Patent Application No. PA 2015 70032, filed on 21 Jan. 2015. The content of each of the above referenced patent applications is incorporated herein by reference in its entirety for any purpose whatsoever.

A toy comprising a rotor and a centrally arranged capsule, wherein the capsule comprises an actuator mechanism that is configured to cooperate with a launch element and an actuator means, wherein the actuator means is configured for engaging with the actuator mechanism to transfer a momentum to the rotor, whereby the rotor can rotate and be launched from the launch element.

BACKGROUND

Many variations of toys with flywheels are already available.

Those types of toy typically comprise a rotor and a position for launching, wherein the launch pad has rotation-actuating means in the form of eg a cord pull, a toothed draw bar, or an electric motor. When the rotor is located in the launch pad, the tractive force from the cord pull or the toothed bar is transferred to a rotation force which makes the rotor rotate, and when the rotation force becomes sufficiently strong, the rotor takes off from the launch pad.

U.S. Pat. No. 4,781,642 describes a toy comprising a launcher and a rotating blade. The rotating blade has a plurality of radially extending, generally horizontal blades that are adapted to rotate by means of an electric motor that is mounted within a handheld launcher. The blade has a central cockpit in which a figure device is located.

However, in many cases it is desirable to increase the options for variation.

BRIEF DESCRIPTION OF THE INVENTION

It is the object of the invention to provide a toy with a rotor that creates increased options for variation and is safer in use.

This is accomplished as described above in that the capsule is a separate part relative to the rotor, and that the capsule comprises at least two capsule parts whereby the two capsule parts can be opened when the rotor and the capsule are separated, and wherein rotor, capsule and the actuator mechanism are connected to each other to the effect that the momentum from the actuator means is transferred to the actuator mechanism that conveys the momentum on from the capsule to the rotor, when the at least two capsule parts are closed.

Hereby it is accomplished that it will not be possible to launch the rotor unless the capsule is assembled from the capsule parts since the momentum can be transferred to the rotor only when the at least two capsule parts are connected to each other and the capsule is connected to the rotor.

Thereby a safer toy is obtained since a figure inside the capsule will not be flung out of the capsule when the rotor is launched.

The term "rotor" is to be understood as a device which is configured such that the rotor creates, by rotation, a lift, thereby enabling it to lift itself off the launch device; it may eg be a rotor blade with inclining rotor blades.

According to an embodiment of the invention, the rotor comprises a centred circular through-going hole for receiving the capsule when the two capsule parts are interconnected. Hereby it is accomplished that the capsule is positioned and, in a particular embodiment, is also secured flush-centre in the rotor for stable flying.

According to an embodiment of the invention, the rotor comprises a locking mechanism, whereby the at least two capsule parts remain connected to each other and the rotor, when the rotor is launched. Hereby it is accomplished that the toy is safer since the capsule is not opened unintentionally following launching, and hence that the risk is reduced that a figure contained within the capsule is ejected from the capsule.

According to an embodiment of the invention, the first capsule part comprises the actuator mechanism, and wherein the locking mechanism on the rotor is configured such that the locking mechanism locks the first capsule part to the rotor when the first capsule part is connected to the second capsule part whereby both capsule parts and the rotor must be interconnected via the locking mechanism before a transfer of force takes place from capsule comprising the actuator mechanism to the rotor.

According to an embodiment of the invention, the locking mechanism is constituted by a bayonet fastening, wherein the rotor comprises one or more protrusions that are configured for engaging with the recess in the capsule whereby the bayonet fastening locks the rotor to the capsule when the two capsule parts are connected.

According to an embodiment of the invention, the locking mechanism is positioned at a distance from the central through-going hole which is larger than the expanse of the first capsule part when the first capsule part alone is connected to the rotor to the effect that the first capsule part can rotate without the rotor. Hereby it is accomplished that the locking mechanism locks the first capsule part to the rotor only when the first and second capsule parts are connected.

According to an embodiment of the invention, the locking direction of the locking mechanism is equal to the direction of rotation of the rotor, and the locking mechanism maintains the first and the second capsule parts mutually interconnected to the effect that unintended separation of rotor and capsule is prevented when the rotor is launched.

According to an embodiment of the invention, the capsule comprises, interiorly, coupling means. Hereby it is accomplished that the figure can be securely coupled within the capsule.

According to an embodiment of the invention, the at least one capsule part is configured from a transparent material. Hereby it is accomplished that a figure arranged within the capsule is visible.

According to an embodiment of the invention, the actuator means is configured with a cross-section corresponding to the cross-section of the slit opening on the launch element whereby the actuator means is capable of engaging and influencing the actuator mechanism in one direction of rotation only, whereby the direction of rotation of the rotor will, when being launched, lock the locking mechanism whereby unintended separation between the capsule and the rotor is avoided.

LIST OF FIGURES

An embodiment of the invention will now be explained in further detail with reference to the drawing, wherein FIG. 1 illustrates a toy according to the invention, in a perspective view;

DETAILED DESCRIPTION WITH REFERENCE TO THE FIGURES

Figure 1:
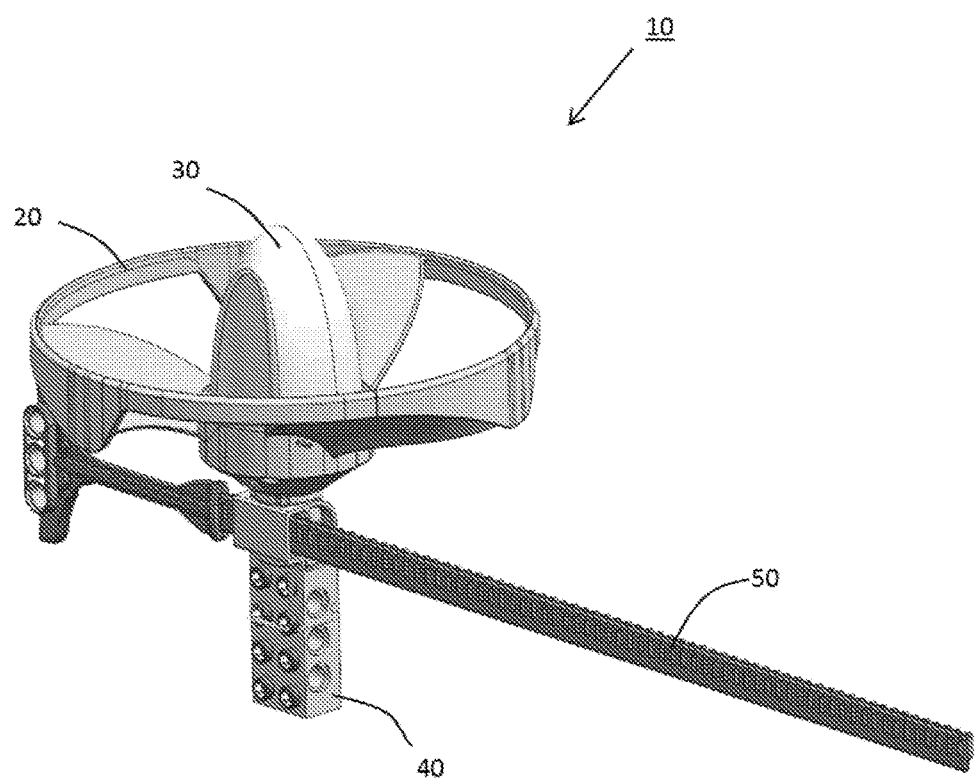

The present invention relates, as shown in FIG. 1, a toy (10) comprising a rotor (20).

The toy (10) comprises a rotor (20) and a centrally arranged capsule (30), wherein the capsule is configured to cooperate with a launch element (40) and an actuator means (50), wherein the actuator means is configured for engaging with the actuator mechanism (33) to transfer a momentum to the rotor (20). The rotor (20) with closed capsule (30) is arranged on a launch element (40) and can be caused to rotate via an actuator mechanism and the actuator means (50). The rotor can rotate and be launched from the launch element (40) when the capsule is closed.

The capsule (30) comprises at least two capsule parts (31, 32) and is a separate part relative to the rotor. When the rotor and the capsule are separated, the at least two capsule parts (31, 32) can be opened.

The toy is configured such that a momentum from the actuator means (50) is transferred only to the actuator mechanism (33) which conveys the momentum from the capsule (30) on to the rotor (20) when the at least two capsule parts (31, 32) are interconnected.

Thus, the rotor cannot be actuated when only the one capsule part is present.

Figure 2:
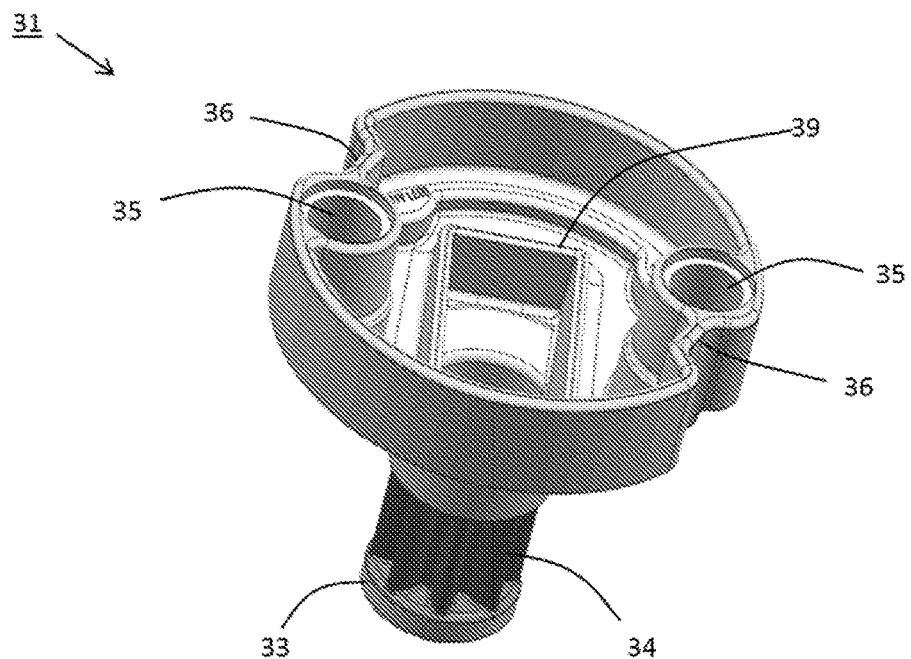
FIG. 2 illustrates, in a perspective view, a first capsule part.
Figure 3:
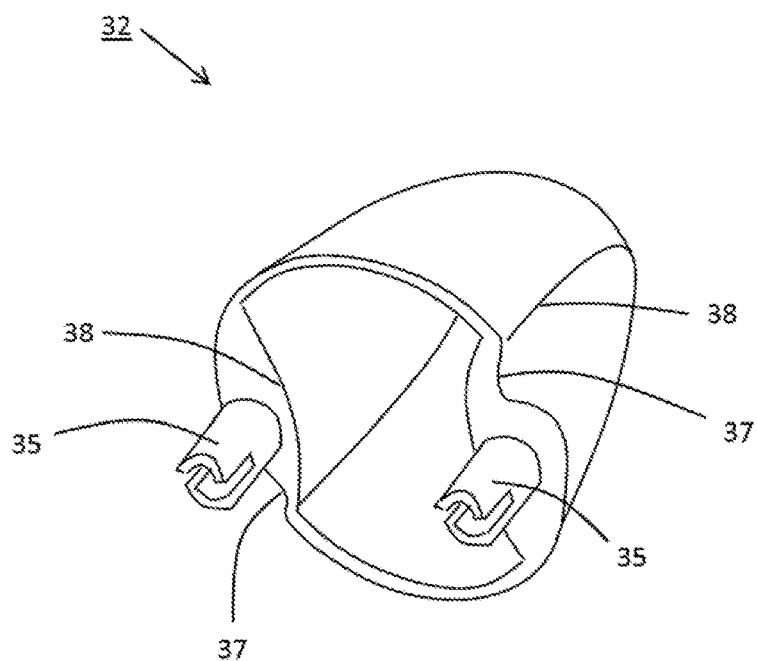
FIG. 3 illustrates a second capsule part, in a perspective view.

FIG. 2 shows a first capsule part (31), and FIG. 3 shows a second capsule part.

The first capsule part (31) comprises an actuator mechanism (33) which is illustrated as a toothed wheel (34). Moreover, the shown first capsule part (31) comprises an indentation (36), capsule coupling means (35) and coupling means (39) for positioning of a figure (not shown).

The second capsule part (32), shown in FIG. 3, comprises complementary capsule coupling means (35) whereby the two capsule parts can be interconnected via the capsule coupling means (35). The second capsule part moreover comprises two cut-outs, a cut-out (37) for passage of locking mechanism (21) (shown in FIG. 5) and a second cut-out (38) for abutment of the locking mechanism (21), respectively. The second cut-out has a concave configuration.

The locking mechanism (21) is illustrated as a bayonet fastening in the form of a protrusion on the rotor that can pass the two cut-outs (36, 37) on the two capsule parts, and then the protrusion can be rotated in an anti-clockwise direction for fixed position with the protrusion by abutment on the side face of the second cut-out (38) on the second capsule part (32). The locking mechanism thereby retains both the two capsule parts and the rotor in interconnected position.

Figure 4:
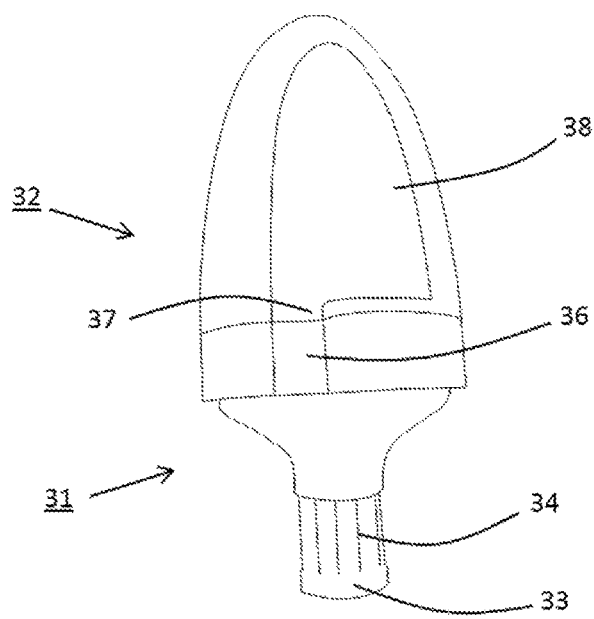
FIG. 4 illustrates a capsule comprising actuator mechanism.

FIG. 4 shows the two capsule parts (31, 32) interconnected to a closed capsule.

The one capsule part (31) comprises an actuator mechanism (33) in the form of a toothed wheel (34). The one capsule part also comprises an indentation (36) for passage of the locking mechanism (21) illustrated as a protrusion on the rotor in FIG. 5. The second capsule part (32) comprises a cut-out (37) for passage of the locking mechanism (21) (shown in FIG. 5) and a second cut-out (38) for abutment of the locking mechanism (21).

Figure 5:
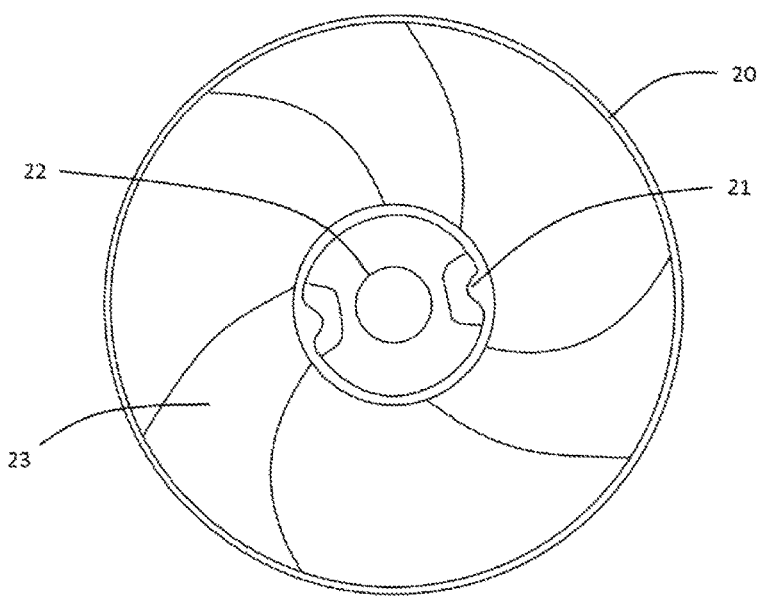
FIG. 5 illustrates a rotor, seen from above.

FIG. 5 shows the rotor with the circular periphery seen from above. The rotor comprises two locking mechanisms (21) in the shape of two protrusions and a centrally arranged through-going hole (22) and three swivel arms (23). The cut-outs (37, 38) in FIG. 3 are for passage of the locking mechanism (21), when the at least two capsule parts and the rotor are interconnected and securely locked to each other. The shown bayonet fastening is configured such that when the two capsule parts are interconnected and are conveyed partially through the centrally arranged through-going hole (22), the locking mechanism (21) in the shape of protrusions will, in turn, pass the cut-out (37) and then the capsule may be caused to rotate about the centre axis whereby the protrusion is turned and abuts on the concave cut-out (38), and thereby capsule and rotor are securely locked to each other about the axis of rotation in the same direction as the locking direction.

The locking mechanism (21) is positioned at a distance along the centre axis from the central through-going hole (22) which is larger than the expanse of the first capsule part (31) when this first capsule part (31) only is connected to the rotor (20).

Thereby the first capsule part (31) can rotate in the central through-going hole (22) without it being locked to the locking mechanism (21), and thereby the first capsule part can be rotated without rotating the rotor (20).

Figure 6:
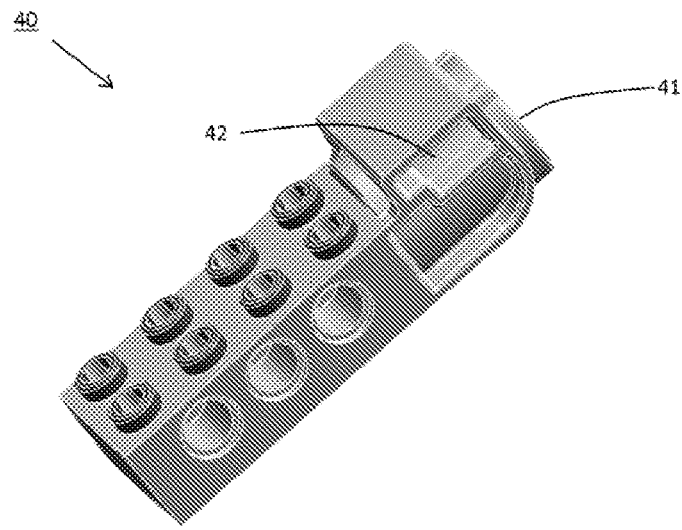
FIG. 6 illustrates, in a perspective view, a launch element.

FIG. 6 shows the launch element (40) with the launch device (41) and a through-going slit (42). The launching position (41) is configured to completely or partially receive the actuator mechanism (33) whereby the actuator means (50), when it is introduced into the through-going slot, can engage with the actuator mechanism (33).

The actuator mechanism (33) sits on the first capsule part (31), and the locking mechanism (21) is configured to lock the first capsule part (31) to the rotor only when the first capsule part (31) is connected to the second capsule part (22) to the effect that both capsule parts and the rotor (20) need to be interconnected via the locking mechanism (21) before a transfer of force from the capsule (30) comprising the actuator mechanism (33) to the rotor (20).

The locking mechanism (21) is constituted by a bayonet fastening in the form of a protrusion. That protrusion is positioned at a distance from the centrally located through-going hole (22). The protrusion will be arranged over the first capsule part when it is mounted on its own in the central hole in the rotor and will thereby not lock the first capsule part to the rotor, and hence the first capsule part will be poor at transferring the rotation force to the rotor if it is attempted to insert only the rotor and the first capsule part in the launch element (40).

The capsule may be completely or partially made of a transparent material. Thereby it is possible to see a figure placed within the capsule.

Figure 7:
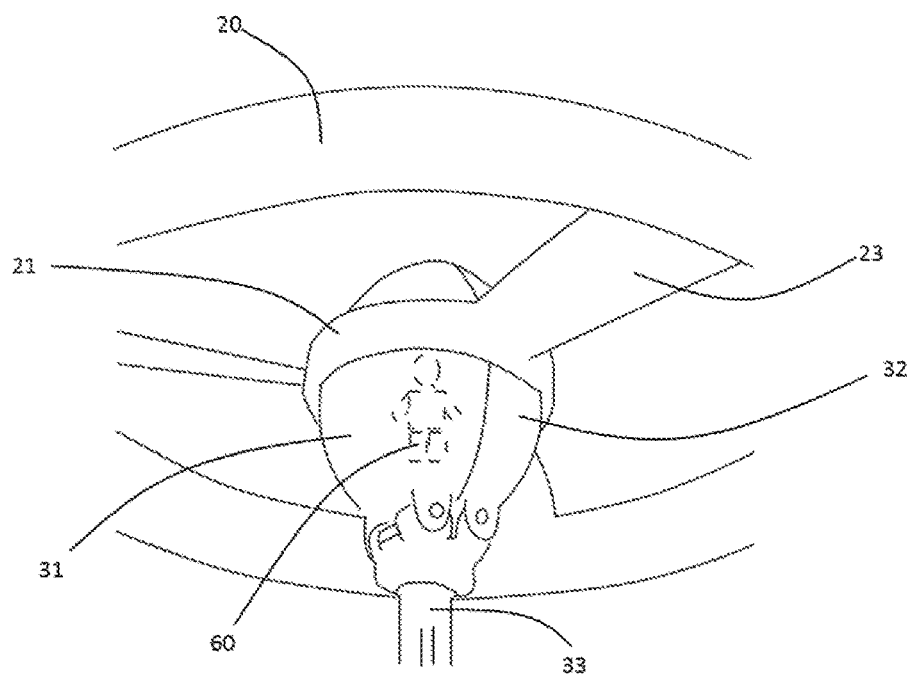
FIG. 7 illustrates an embodiment of capsule and rotor, in a perspective view.

FIG. 7 shows an alternative construction of the two capsule parts (31, 32) and the rotor (20). In that embodiment the capsule is divided in the same plane as the axis of rotation and can be kept together by the locking mechanism (21) of the rotor which is, in this case, configured as a cylindrical band that squeezes around the two capsule parts that are formed of a centred circular through-going hole.

The capsule is illustrated with an oval cross section, but may also have other cross-sections to achieve the same effect, eg circular. The two capsule parts (31, 32) are hinged onto the actuator mechanism (33) whereby the two capsule parts can be opened like the petals of a flower, which enables access to the capsule interior. Thereby a figure can be arranged within the capsule.

The cylindrical band of the rotor can be pressed down over the capsule when the two capsule parts are closed and thereby ensure that the figure cannot be flung out by the rotor being launched from the launch pad.

The actuator means (50) (shown in FIG. 1) is configured eg with an L-shaped cross-section whereby the actuator means can be introduced into the slit opening (42) in one direction only, meaning that the direction of rotation is, when the rotor is launched, such that, upon launching, the rotor locks the locking mechanism (21) whereby unintended separation of the capsule (30), including the two capsule parts, and the rotor (20) can be avoided.

For instance, if the capsule is rotated in the clockwise direction, and the locking mechanism is rotated in the anti-clockwise direction when being locked, then the rotor is likewise rotated in the clockwise direction when being launched in order to avoid that the locking mechanism is unlocked and that rotor and capsule parts are unintentionally separated.

The invention claimed is:

1. A toy comprising:
   a rotor; and
   a centrally arranged capsule;
   wherein the capsule comprises an actuator mechanism configured to cooperate with a launch element and an actuator means;
   wherein the actuator means is configured for engaging with the actuator mechanism to transfer a momentum to the rotor, whereby the rotor can rotate and be launched from the launch element;
   wherein the capsule is a separate part relative to the rotor; and
   wherein the capsule comprises at least two capsule parts, a first capsule part connecting on one end to the launch element and on another end to a second capsule part, whereby the two capsule parts can be opened when the rotor and the capsule are separated, and wherein the rotor, the capsule and the actuator mechanism are connected to each other to the effect that the momentum from the actuator means is transferred to the actuator mechanism that conveys the momentum from the capsule to the rotor, when the at least two capsule parts are closed.

2. A toy according to claim 1, wherein the rotor comprises a centered circular through-going hole for receiving the capsule when the two capsule parts are interconnected.

3. A toy according to claim 1, wherein the rotor comprises a locking mechanism, whereby the at least two capsule parts remain connected to each other and the rotor, when the rotor is launched.

4. A toy according to claim 3, wherein the first capsule part comprises the actuator mechanism and wherein the locking mechanism on the rotor is configured such that the locking mechanism locks the first capsule part to the rotor when the first capsule part is connected to the second capsule part whereby both capsule parts and the rotor must be interconnected via the locking mechanism before a transfer of force takes place from the capsule comprising the actuator mechanism to the rotor.

5. A toy according to claim 3, wherein the locking mechanism is constituted by a bayonet fastening, wherein the rotor comprises one or more protrusions that are configured for engaging with a recess in the capsule whereby the bayonet fastening locks the rotor to the capsule when the two capsule parts are connected.

6. A toy according to claim 5, wherein the locking mechanism is positioned at a distance along a center axis from the central through-going hole which is larger than an expanse of the first capsule part when the first capsule part only is connected to the rotor to the effect that the first capsule part can rotate without the rotor.

7. A toy according to claim 3, wherein a locking direction of the locking mechanism is equal to the direction of rotation of the rotor and wherein the locking mechanism secures the first and the second capsule parts mutually interconnected to the effect that unintended separation of rotor and capsule is prevented when the rotor is launched.

8. A toy according to claim 1, wherein the capsule comprises, interiorly, coupling means, whereby a figure can be arranged within the capsule.

9. A toy according to claim 1, wherein at least the one capsule part is configured from a transparent material.

10. A toy according to claim 1, wherein the actuator means is configured with a cross-section corresponding to a cross-section of a slit opening on the launch element whereby the actuator means is capable of engaging and influencing the actuator mechanism in one direction of rotation only, whereby the direction of rotation of the rotor will, when being launched, lock the locking mechanism whereby unintended separation between the capsule and the rotor is avoided.

* * * * *